United States Patent [19]

Amon et al.

[11] Patent Number: 4,746,798
[45] Date of Patent: May 24, 1988

[54] COMPACT OPTICAL WAVELENGTH DISCRIMINATOR RADIOMETER

[75] Inventors: Max Amon, Maitland; Jefferson E. Odhner, Orlando, both of Fla.

[73] Assignee: Martin Marietta Corporation, Bethesda, Md.

[21] Appl. No.: 897,671

[22] Filed: Aug. 18, 1986

[51] Int. Cl.$^4$ .............................................. G01J 1/00
[52] U.S. Cl. ................................... 250/339; 250/347; 250/349; 350/173
[58] Field of Search ............... 250/353, 339, 349, 352, 250/347; 356/407, 419; 350/166, 164, 171, 169, 172, 173, 602,

[56] References Cited

U.S. PATENT DOCUMENTS

| | | | |
|---|---|---|---|
| 3,130,308 | 4/1964 | Astheimer | 250/83.3 |
| 3,696,202 | 10/1972 | Mori et al. | 178/5.4 |
| 3,767,290 | 10/1973 | Lang et al. | 350/173 |
| 3,922,069 | 11/1975 | Kishikawa et al. | 350/173 |
| 4,215,273 | 7/1980 | Stokes et al. | 250/347 |
| 4,284,323 | 8/1981 | Jankowitz | 350/1.6 |
| 4,411,492 | 10/1983 | Bluege | 350/173 |

FOREIGN PATENT DOCUMENTS 5,843,368  6/1983  Japan .
5,852,526  6/1983  Japan .
A,4706538  8/1937  United Kingdom .

OTHER PUBLICATIONS

Applied Optics, Vol. 21, No. 7, April 1, 1982, pp. 1259–261, "Induced-transmission interference-filter array for multiwavelength pyrom.

*Primary Examiner*—Janice A. Howell
*Attorney, Agent, or Firm*—Julian C. Renfro

[57] ABSTRACT

A wavelength discriminator designed to collect broadband, multiple wavelength input energy, to isolate specific narrow bands of interest, and to image such narrow bands of interest upon closely spaced, separate detectors. This discriminator comprises optical devices (22, 18) for directing incoming radiant energy of a certain quality and involving a wide range of wavelengths through first (26a) and second (26b) wavelength selective reflectors separated by a medium that transmits the wavelengths of interest. The wavelength selective reflectors in accordance with this invention are in a non-parallel configuration and disposed in a double pass geometrical arrangement wherein energy of a certain wavelength reflected from the second wavelength selective reflector (26b) passes back through the first wavelength selective reflector (26a), with the energy from the first and second wavelength reflectors thereafter being directed onto respective detectors (32a and 32b). An embodiment involving a third wavelength selective reflector (26c) grouped with the first and second reflectors may be utilized, wherein energy of a different wavelength reflected from the third wavelength selective reflector passes back through both the second and first wavelength selective reflectors, with the selected wavelengths thereafter falling upon three separate detectors (32a, 32b and 32c) of the array.

33 Claims, 10 Drawing Sheets

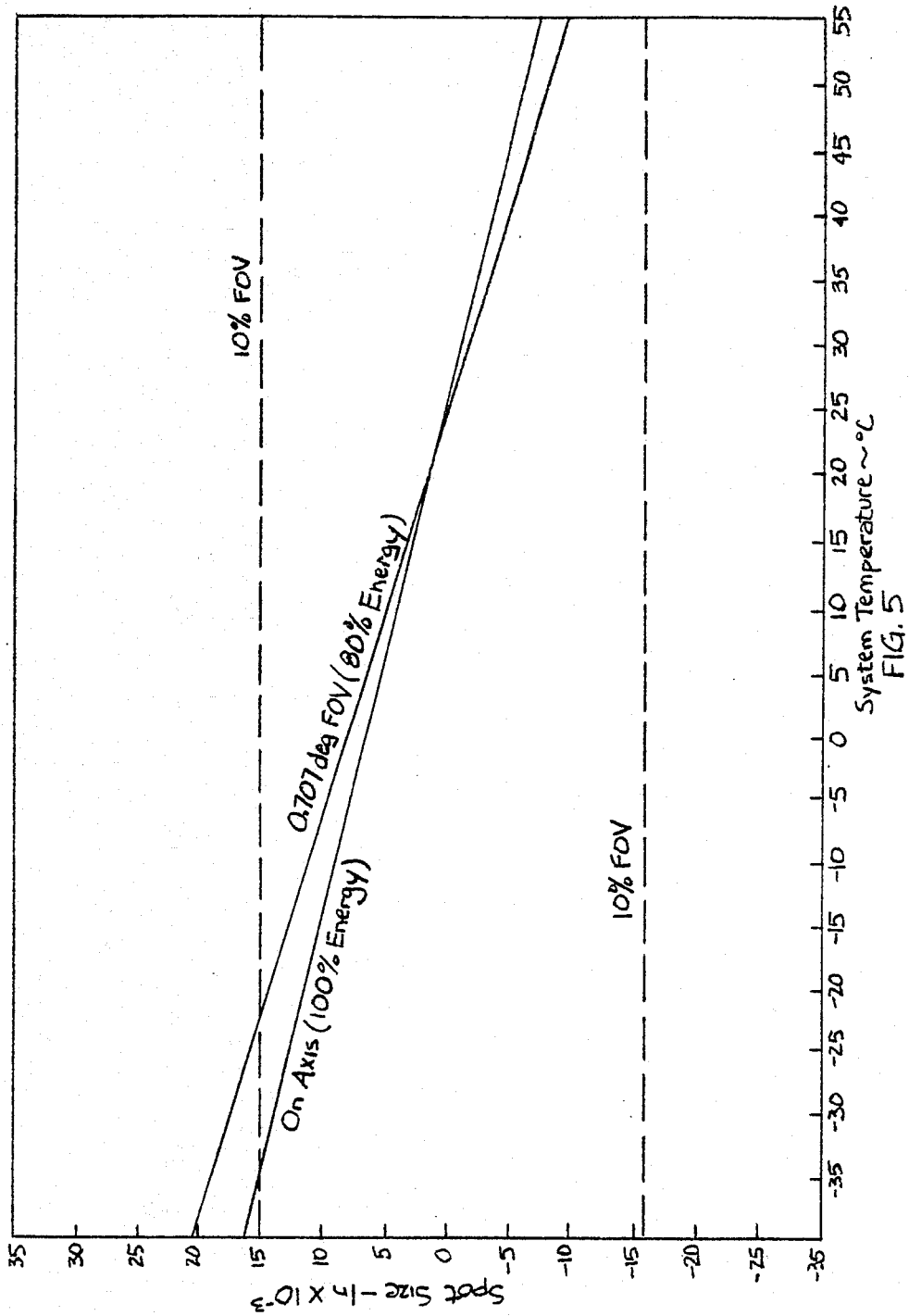

COMPACT OPTICAL WAVELENGTH DISCRIMINATOR RADIOMETER

This invention was made with Government support under Contract No. F33657-85-C-3533 awarded by the Department of the Air Force. The Government has certain rights in this invention.

TECHNICAL FIELD

This invention relates to wavelength discriminator radiometers, and more particularly to devices used to angularly separate two or more wavelengths of interest.

BACKGROUND ART

It is known that wavelength discrimination can be accomplished by collecting broadband energy and then isolating specific narrow bands of interest and imaging them onto energy sensors. Narrow band flashes are readily detected because such signals will trigger an electrical current in only one channel of a state of the art device. The design approach usually adopted for such a device uses a simple catadioptric afocal telescope to collect and collimate the incoming energy and two dichroic beam splitters to isolate the wavelengths of interest. Typically this is followed by three separate imaging optics, three separate detectors and three separate detector coolers. It obviously would be advantageous to find an efficient technique that would combine the optical paths through a single imaging optic and place the three detectors on a single detector cooler.

Prior art devices typically utilize a large primary mirror that serves to collect and image the energy from extended sources. The energy is then recollimated to form a classical Newtonian Telescope. Three dichroic beamsplitters are then located in the collimated space separating the three selected wavelengths of interest and sending them to three separate imager optics and to three separate detectors. This solution is straightforward but results in a large, heavy and expensive system.

It was in an effort to improve upon systems of this type that the present invention was evolved.

DISCLOSURE OF INVENTION

In accordance with this invention we have created an optical wavelength discriminator radiometer that angularly separates two or more wavelengths of interest, and then recombines their paths through a single imager lens such that an appropriate number of separate detectors may advantageously be located on the same cold finger. This is accomplished by a unique arrangement of dichroic plates that both combines the optical paths of the several wavelengths and angularly separates them. The detectors may be located on a single detector cooler, but yet they are sufficiently isolated that the signals of each wavelength are imaged onto separate detectors and may thereby be discriminated. The resultant system is lighter, smaller, less expensive, and generally more satisfactory than the conventional approach.

We have found it advantageous to provide an instrument capable of discriminating the flashes of extended sources at three discrete, selected wavelengths and conforming to the characteristics summarized below:

| | |
|---|---|
| Aperture Diameter | 12 inches |
| Field of View | 1.0 × 1.0 degrees |
| Field of Regard | +/− 2.5 degrees in elevation |
| Effective Focal Length | 9.0 inches |
| f/number | 0.75 |
| Detector | 4.0 × 4.0 mm each |
| Field stop | restricting field of view |
| Operating Temperature range | −40° to 50° C. |

The three detectors must be close enough to be placed on a single cooler but sufficiently separated so that the image at each wavelength can be readily discriminated.

For purposes of illustration we have designated wavelengths $\lambda_1$ and $\lambda_2$ as isolated narrow spectral bands and wavelength $\lambda_3$ as broadband. If a signal is received by either sensor #1 or sensor #2 and not the #3 sensor, then a narrow band source has been detected. The #3 sensor therefore serves as a guard channel against false alarms.

It is important to note that in accordance with our invention, detectors can be placed on a single substrate as a result of spacing wavelength selective reflectors closely together and disposed at proper angular relationships. It is to be realized, however, that a wavelength selective reflector or dichroic beamsplitter that reflects one wavelength must also be able to transmit the wavelengths reflected by succeeding dichroic beamsplitters of the array.

Inasmuch as a single imager lens can be utilized in accordance with our advantageous arrangement to image incoming light on all three of the detectors, there is an accompanying saving of cost, weight and size. As will be obvious to those skilled in this art, our novel dichroic beamsplitter arrangement is particularly advantageous in conjunction with the use of infrared detectors, where cooling is often required.

The wavelength selective reflectors (dichroic beamsplitter) we use are dichroic filters and hence have a center reflecting wavelength that shifts with incident angle. Consequently, collimating optics are usually required in order to keep the incident angle as small as possible, and it is to be realized there will always be slight angle variations due to the field of view.

Another significant aspect of our invention is the used of a field stop, for without the use of this device, light entering the system from outside the designated field of view may impinge on the wrong detector, thus giving rise to a false signal. In applications where the incoming energy will never be out of the designed field of view, the field stop is not required.

Light from outside the intended field of view is effectively blocked by the field stop, whereas light inside the field of view is split up both spectrally and angularly and as a result fills each intended detector with a single wavelength or bands of wavelength depending on the dichroic beamsplitter design. It is most important to realize that in accordance with our invention, each detector sees the entire field of view.

The transmission analysis summarized in Table 1 below shows the transmission at the three wavelengths of interest. It is to be noted that the energy loss due to double passing the dichroic beamsplitters (here designated merely as "beamsplitters") is only 20% at wavelength $\lambda_2$ and 18% at wavelength $\lambda_3$. With the exception of this energy loss, which is not prohibitive, the transmission is the same as in a conventional design.

TABLE 1

| | Transmission Analysis | | |
|---|---|---|---|
| | $\lambda_1$ | $\lambda_2$ | $\lambda_3$ |
| Window | 0.889 | 0.932 | 0.863 |
| Fold Mirror | 0.990 | 0.990 | 0.990 |
| Obscuration | 0.960 | 0.960 | 0.960 |
| Parabolic Mirror | 0.990 | 0.990 | 0.990 |
| Lens 1 | 0.920 | 0.940 | 0.880 |
| Lens 2 | 0.920 | 0.940 | 0.880 |
| Lens 3 | 0.920 | 0.940 | 0.880 |
| Beamsplitter #1 | 0.970 | 0.800 | 0.850 |
| Beamsplitter #2 | — | 0.950 | 0.970 |
| Beamsplitter #3 | — | — | 0.990 |
| Beamsplitter #2 | — | 80% { — | 82% { 0.970 |
| Beamsplitter #1 | — | 0.800 | 0.850 |
| Lens 4 | 0.920 | 0.940 | 0.880 |
| Lens 5 | 0.920 | 0.940 | 0.880 |
| Lens 6 | 0.920 | 0.940 | 0.880 |
| Dewar Window | 0.920 | 0.947 | 0.880 |
| Cold Filter | 0.699 | 0.600 | — |
| Total Transmission: | 0.316 | 0.209 | 0.223 |

Those skilled in this art will quickly see that the 82% normalized transmission at wavelength $\lambda_3$ is calculated by multiplying the normalized transmission of 0.990 for dichroic beamsplitter #3; by 0.970 for beamsplitter #2; and by 0.850 for beamsplitter #1.

Broadly, our invention involves a wavelength discriminator designed to collect multiple wavelength input energy, to isolate specific narrow bands of interest, and to image such narrow bands of interest upon closely spaced, discrete detectors. Our novel discriminator comprises means for directing incoming radiant energy of a certain quality and involving a wide range of wavelengths through first and second wavelength selective reflectors separated by a medium that transmits the wavelengths of interest. Advantageously, our wavelength selective reflectors are disposed in a double pass geometrical arrangement wherein energy reflected from the second wavelength selective reflector passes back through the first wavelength reflector. This novel double pass arrangement makes possible the use of the same imaging system to focus light rays that have been angularly displaced, onto respective detectors that have been spatially separated to a small extent.

We are not limited to the use of only two wavelength selective reflectors, for it is within the spirit of our invention to use a third wavelength selective reflector in a double pass arrangement, in order that a third selected frequency can be discriminated by a third detector, spaced closely to the other two detectors.

It is therefore a principal object of our invention to provide an instrument capable of discriminating the flashes of extended sources at two or more discrete wavelengths, while still having size and temperature characteristics that are reasonable under typical conditions of operation.

It is another object of our invention to provide an instrument design involving two or more detectors spaced together closely enough that they can be placed on a single cooler, but at the same time not preventing the image at each wavelength from being readily discriminated.

It is still another object of our invention to provide an optical wavelength discriminator enabling the construction of a lighter, cheaper, and more compact system that is possible in accordance with conventional, state-of-the-art designs.

These and other objects, features and advantages of this invention will become more apparent from a study of the following text and the appended drawings.

BRIEF DESCRIPTION OF DRAWINGS

FIG. 5 is a graph showing how the spot size on an outer detector increases in size, measured in mils, with variations in temperature, with it to be noted that most of the spot size variations with temperature fall within the dotted lines representing 10% of the field of view, which criteria was met by this invention;

BEST MODE FOR CARRYING OUT THE INVENTION

Figure 1:
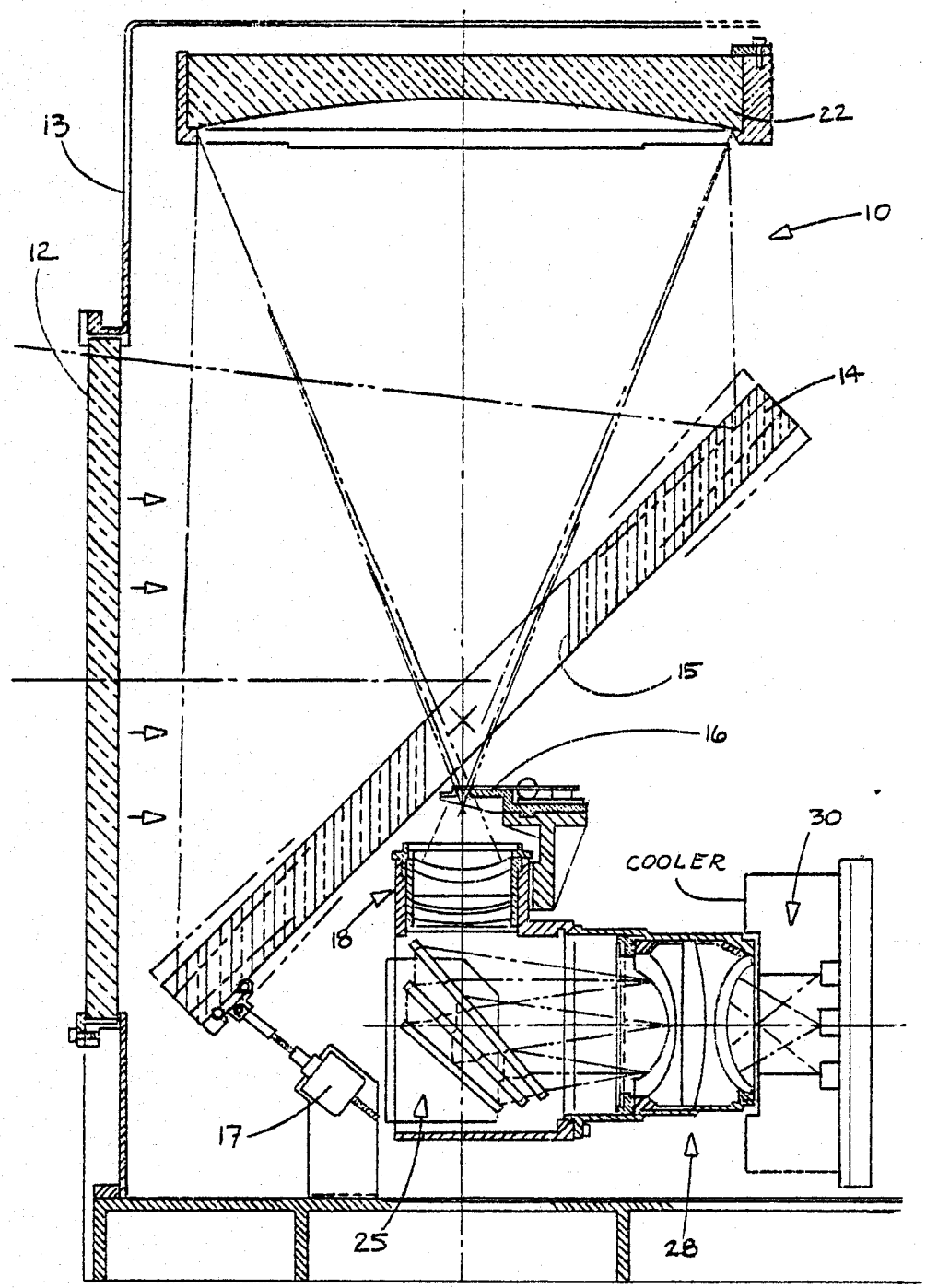
FIG. 1 is a layout of certain principal components of our compact optical wavelength discriminator, with portions shown in cross section to reveal internal construction.

Turning first to FIG. 1, it will there be seen that we have illustrated a wavelength discriminator radiometer 10 in accordance with a preferred embodiment of this invention.

Imcoming radiant energy enters through a window 12, which may be of germanium and for example may be fifteen inches in diameter and 0.75 inches thick. The window is anti-reflection coated on both sides and the window is hermetically sealed to the case 13 to keep out dirt and contamination. The window must be larger than the collecting aperture so that a desired 1.0×1.0 degree field of view and the desired +/−2.5 degree elevation field of regard are not vignetted.

The energy that has entered the window then falls upon a gimballed fold mirror 14, also known as an elevation mirror. Contained in a mid portion of mirror 14 is an aperture 15, directly behind which is a field stop 16. Mechanism 17 permits angular adjustments of the angle of the mirror 14 that are needed in order to adjust the field of regard.

The requirement for a lightweight system forced the exploration of novel solutions for the large mirror 14, which mirror for example may measure 18 by 13 inches. The search resulted in an unusual lightweight mirror material called Foamed Aluminum manufactured by Energy Research Group in San Diego, Calif. The material is made by foaming molten aluminum with inert gas and then cooling it. The sponge-like material is then milled into the desired shape and solid plates are then brazed to the front and back. The front surface of the mirror was diamond turned to a flatness requirement of $\frac{1}{4}$ wave at 10 microns. The product is extremely lightweight but nevertheless has excellent rigidity so that a quality optical surface can be achieved. The mirror 14 we prefer to use weighs only 4.25 pounds when made of foamed aluminum, whereas a solid block of the same dimensions would weith 26 pounds. This weight reduction along with the elimination of two of the original three detector coolers resulted in a net weight reduction of approximately 90 pounds from our overall system.

Energy reflected from gimballed fold mirror 14 is directed upon parabolic mirror 22, which serves as a suitably large collecting aperture for the system, and focusses the incoming energy at the field stop 16. The f/1.25 parabolic mirror 22 we prefer to use is 12 inches in diameter and has a 15" focal length, and it permits a large collection aperture. The parabolic shape was achieved by diamond turning an aluminum block. The quality of the mirror 22 insofar as forming a good image was assured by the requirement that the image of a point source formed by the parabola would contain 80 percent of the energy within a 0.001" diameter pinhole.

The field stop 16 is located at the focal point of the parabola to prevent radiation outside the field of view from impinging on the wrong detector. The field stop advantageously restricts the field of view, thereby entirely eliminating the problem associated with the receipt of extraneous radiation.

Figure 2:
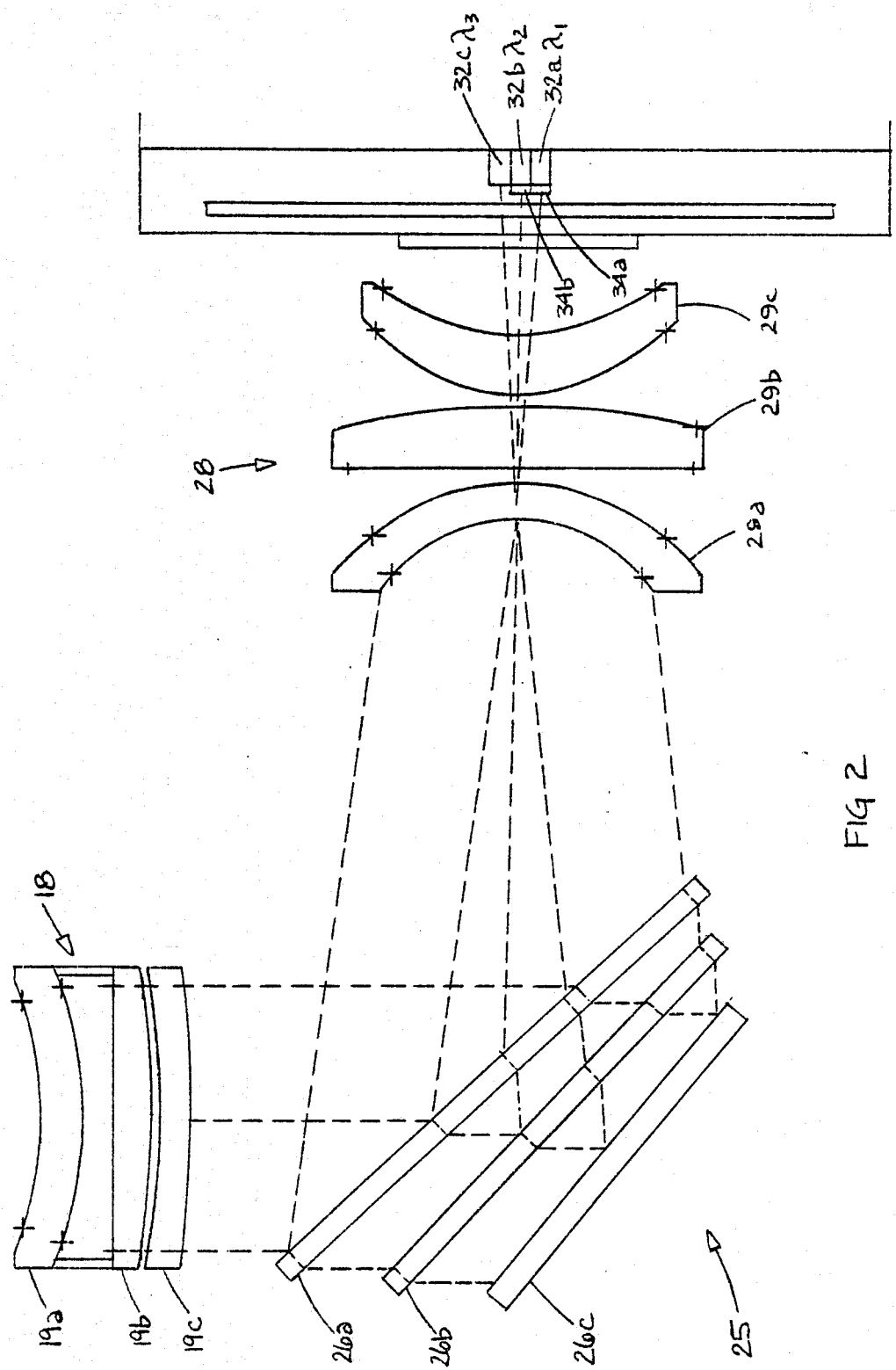
FIG. 2 is a view similar to FIG. 1 but constructed to a larger scale to reveal the components constituting the heart of our invention, involving three dichroic beamsplitter (filter) plates along with the collimator, imager and detectors, with the approximate ray path from each dichroic filter plate to the respective detector also being shown.

The energy from the mirror 22 passing through the field stop 16 is then collimated by the f/1.25 triplet lens assembly 18, which is well corrected over the entire spectral band of interest. FIG. 2 reveals the triplet lens assembly to a larger scale, and for an infra-red system, the elements 19a and 19b are preferably germanium, whereas the element 19c is zinc selenide. For a visible/near infrared system, the lenses may be chosen from a number of suitable standard Schott optical glasses, such as Schott LAK 10 and Schott SF 58 crown-flint combination used in the collimator and imager optical groups. This typical combination enables correction for chromatic aberration.

It is preferred that the rays of all the wavelengths be well collimated or the tilted dichroic beamsplitter plates that follow may not pass the radiation due to total internal reflection, because the angle variation may be out of the dichroic filter acceptance angle for reflecting the band of interest. However, it is also true that if our device was being designed to receive only collimated light, in some instances the collimating optics could be dispensed with.

A typical acceptance angle for a dichroic filter is about 10°. The lenses 19a, 19b and 19c of the collimating triplet lens assembly 18 in conjunction with the parabola 22 may be regarded as forming a 7.2× a focal telescope.

Inasmuch as the energy emerging from the triplet 18 is well collimated and the dichroic beamsplitter plates are plano parallel parts, they have no effect on the aberrations of the system and serve only to separate and direct the wavelengths of interest.

Radiant energy thus enters a group 25 of wavelength selective reflectors in accordance with this invention, these being 26a, and 26b and 26c, as best revealed in FIG. 2. We may also refer to the wavelength selective reflectors as dichroic beamsplitters, or as radiant energy deflecting members. The first of these wavelength selective reflectors, which is reflector or dichroic beamsplitter 26a, serves to reflect wavelength $\lambda_1$, while permitting the rest of the energy to pass through. Somewhat similarly, reflector or dichroic beamsplitter 26b reflects wavelength $\lambda_2$ while transmitting the rest of the radiant energy. The wavelength $\lambda_2$ reflected by reflector 26b transmit through reflector 26a for the second time, as will be noted from FIG. 2. We prefer to call this "double-passing."

Each plate of out novel wavelength selective reflectors or dichroic beamsplitters is made of material which will transmit all of the wavelengths of interest, and in most instances, it is the front surface of each dichroic beamsplitter that has the dichroic coating permitting certain wavelengths to pass, and it rear side contains a broadband anti-reflection coating.

In one preferred version of our invention, the first two dichroic beamsplitters or reflectors 26a and 26b are made of zinc selenide with a dichroic coating on one side, and a broadband antireflection coating on the other side, whereas reflector 26c is a broadband reflector, that reflects virtually all of the energy incident on it. In the preferred embodiment of our invention, the wavelength selective reflector 26c is an aluminum mirror.

For convenience, we choose to call the remaining broadband energy that has passed through dichroic beamsplitters 26a and 26b wavelength $\lambda_2$, and it is important to note from FIG. 2 that wavelength $\lambda_3$ double passes reflectors 26b and 26a. It is also important to realize that reflector 26b is set at a designated angle, such as an angle of 45°, whereas reflectors 26a and 26c are set at an angle with respect thereto, such that the desired angular separation will be achieved, and so that all three wavelengths are angularly displaced in an advantageous manner. The spacing between the plates is set so that the central ray from each of the wavelengths converage at the center of the imager front lens so as to minimize the size of the imager.

It is obviously of considerable importance that the dichroic beamsplitters we use for the wavelength selective reflectors 26a and 26b pass all the wavelengths involved, and that all three dichroic beamsplitters we use in the preferred embodiment of our invention reflect the three selected narrowband wavelengths.

It will be noted that the dichroic beamsplitter or wavelength selective reflectors depicted in the preferred embodiment of our invention illustrated in FIGS. 1 and 2 are tilted at different angles so that the optical paths of the three wavelengths are displaced angularly, but are recombined at the aperture of the imager 28, which is made up of three individual lenses 29a, 29b and 29c. While the advantages of size, weight, and cost are apparent, the transmission losses, due to doublepassing the dichroic beamsplitters, could have prohibited a functional design. This fortunately was found not to be the case, however, as was shown from the Transmission Analysis set forth in Table 1 hereinabove.

With regard to dichroic beamsplitter position and angles, FIGS. 7 through 10, discussed hereinafter, are illustrative of certain details of our preferred embodiment, wherein the dichroic beamsplitter angles and spacing are determined by the detector spacing and imager focal length. The detector spacing determines the angles at which each wavelength must enter the imager, but mechanical considerations of mounting and adjusting the plates (+2.0°) determines how close the dichroic beamsplitters can be placed.

Continuing with FIGS. 1 and 2, the imager 28, the second triplet, is composed of two germanium lenses and one zinc selenide lens in the preferred embodiment, and focusses the spectrally split energy emerging from the wavelength selective reflectors or dichroic beamsplitters. The imager characteristics of this embodiment may be summarized as follows:

| Imager focal length | 1.25" |
|---|---|
| Imager semi-field angle (spectral) | 3.66 degrees × 3.66 degrees |
| Imager field of view (total) | 7.32 × 26.6 degrees |
| Imager aperture size | 2.52" |

As should now be clear, the collimated energy from each wavelength is then imaged by a triple lens imager assembly 28, involving lens components 29a, 29b and 29c, and by virtue of this arrangement, three separate and distinct images are created, one for each wavelength. The three separate images are then caused to respectively fall upon detectors 32a, 32b and 32c of the detector array 30. For convenience and clarity, the position and separation of the detectors has been exaggerated in FIGS. 1 and 2, and in neither of these figures was it conveniently possible to illustrate to scale, either the size or the positions of the detectors.

It is to be noted that triplets 18 and 28 relay the image of the field stop reduced in size by 0.6×.

Figure 3:
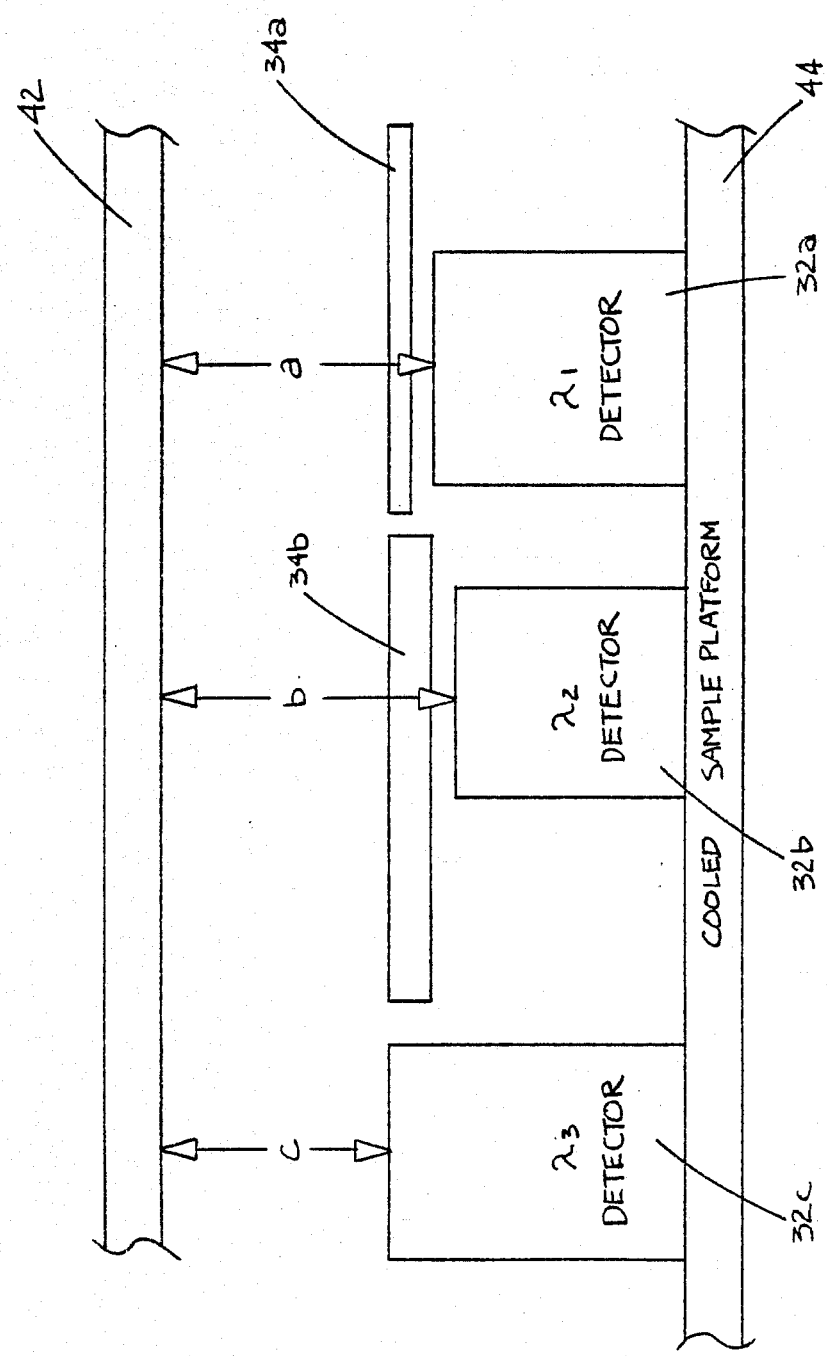
FIG. 3 is a view to a considerably larger scale of a preferred detector arrangement, sealed into a vacuum created behind a dewar window made of material transmissive to all the wavelengths of interest, with cold filters being used to increase signal to noise ratio when low level signals are being discriminated against a noisy background.

With regard to the detectors we prefer to use in conjunction with the preferred embodiment of our invention illustrated in FIGS. 1 and 2, and to a much larger scale in FIG. 3, the detectors 32a, 32b and 32c are in a manner of speaking perpendicular to the plane of the paper, which confines all the parameters of interest to a single plane. This simplifies both the design and fabrication of the system, but it is to be realized that the dichroic beamsplitter plates may be rotated out of the plane of the paper as well to accommodate more wavelengths or reduce the total effective field of view of the imager. It should be remembered however, that this rotation introduces an image rotation as well.

We wish to prevent scattered energy from triggering a false signal, so to that end, in the preferred detector embodiment illustrated to a large scale in FIG. 3, we placed narrow band filters 34a and 34b in front of the detectors 32a and 32b. In the preferred embodiment, detector 32c need not utilize a filter inasmuch as it is the guard channel, and is necessarily sensitive to a wide range of wavelengths.

As will be seen in FIG. 3, a dewar window 42 may be used, which is made of a material that is transmissive to all the wavelengths of interest for an infra-red detection system. Importantly, this window seals in the vacuum in which the detectors 32a, 32b and 32c must be kept for a dewar-cooler arrangement. We have found that a suitable window material for a mid-infra-red detection system is germanium. We provide a cooled sample platform 44 for supporting the detectors 32a, 32b and 32c.

It will be obvious to those skilled in this art that each detector is sensitive to the specific wavelength of interest that is reflected from the respective dichroic beamsplitters. As will be noted from FIG. 2, detector 32a ($\lambda_1$ detector) receives energy reflected from dichroic beamsplitter 26a; detector 32b ($\lambda_2$ detector) receives energy reflected from the dichroic beamsplitter 26b; and detector 32c ($\lambda_3$ detector) receives energy reflected from dichroic beamsplitter 26c.

The detectors 32a, 32b and 32c selected for this preferred embodiment of this invention are:

| Lambda 1 | HgCdTe (Mercury Cadmium Telluride) |
|---|---|
| Lambda 2 | InSb (Indium anteminide) |
| Lambda 3 | InSb |

Fabrication constraints set the minimum detector separation. It is important that the detectors be as close together as possible to minimize the apparent field angle of the imager.

With continued reference to FIG. 3, in the preferred embodiment of our invention, the separation between first detector 32a and the second detector 32b is 0.022 inches, and the separation between the second detector 32b and the third detector 32c is 0.055". It is obvious that we are not to be limited to the use of these particular detectors or to these spacings. Narrow band cold filters 34a and 34b are located in front of the first and second detectors, respectively, rejecting everything but the wavelengths of interest. The third wavelength $\lambda_3$ in the preferred embodiment is broadband, so in this instance, no filter is required. Off the shelf cold filters 34a and 34b were procured with different thicknesses, as will shortly be discussed. The height of each detector was designed to compensate for the different optical paths through the cold filters and the residual chromatic aberration of the imager.

The third detector, detector 32c, is different from the other two inasmuch as in the preferred embodiment it must detect broadband wavelengths. We prefer to utilize infrared detectors, which gain the maximum sensitivity from being cooled, and most advantageously, only a single cooler will in accordance with this invention be sufficient to cool three detectors.

The sample platform 44 is connected via a thermally conductive material to a common cooling device, such as a cold finger (not shown) in which a liquid gas such as liquid nitrogen is being pumped. The exact arrangement is dependent on the dewar cooler manufacturer. Alternatively, we may use a cooling substrate as the cooling device.

The cold filters, which are placed in close proximity to the detectors, serve to increase the signal to noise ratio when low level signals are being discriminated against a noisy background. For high level signal inputs, the cold filters are optional. Note that since the cold filters are plates which act to shorten the focal length of the signal focused on the detector, that the detectors must be further away from the dewar window if the cold filters are removed.

With regard to the specific configuration utilized in our preferred detector embodiment illustrated in FIG. 3, the distance between the interior surface of the dewar window 42 and the sample platform 44 is 0.496 inches, whereas distance a between the interior surface of the window 42 and the top of the detector 32a is 0.3721 inches. The cold filter 34a in front of the detector 32a is 0.0197 inches thick. Distance b between the interior surface of the window 42 and the top of the detector 32b is 0.3994 inches, and the cold filter 34b in front of this detector is 0.030 inches thick. Distance c between the front of detector 32c and the interior of the dewar window is 0.3654 inches, and as previously mentioned, no cold filter is utilized in this particular instance, although one may well be used in the event that detector 32c is being used for selective wavelength discrimination.

Figure 4:
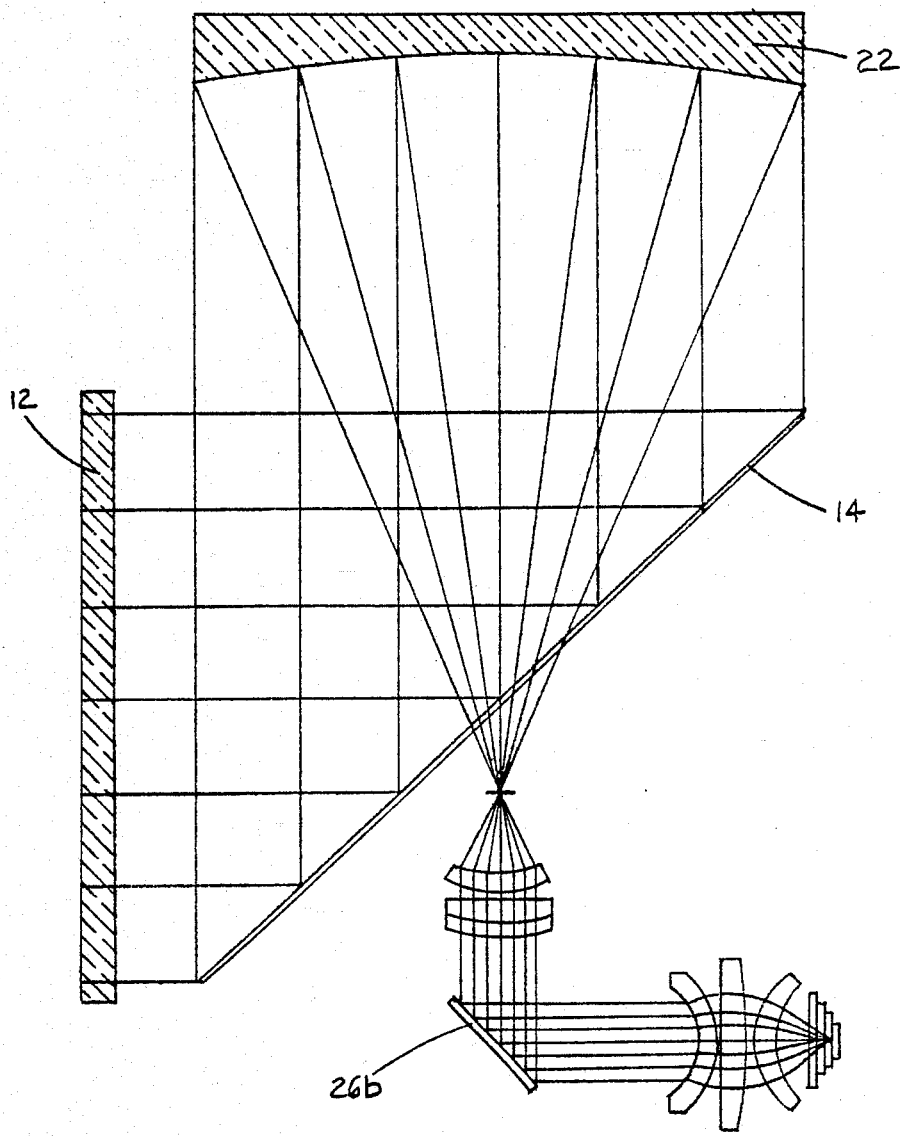
FIG. 4 shows a ray trace drawn with seven rays chosen of the wavelength which reflects off of the center dichroic filter, with all the rays shown focused on the center detector.

The optical design in accordance with the preferred embodiment of our invention was carried out in a modular fashion. The parabolic mirror, the collimating triplet and the imager were designed independently on ACCOS V lens design program. These sub-systems were then combined and raytraced, as shown in FIG. 4, to assure compliance with system requirements. This was done by computing spot diagrams of each wavelength at the appropriate field angles. Table 2 summarizes this data, as will now be seen.

TABLE 2

| Field of View in Degrees | RMS Spot Radius (Mils) | | |
|---|---|---|---|
| | Channel 1 | Channel 2 | Channel 3 |
| 0 | 9.7 | 0.56 | 7.8 |
| 1 | 10.8 | 2.10 | 4.3 |

Since the detectors act as a photon bucket, the spot size on axis and at intermediate points in the field is of little consequence, but it is important that each detector see essentially the same field of view. The size of the point spread image at the edges of each detector will determine the apparent variation in field of view. Experience with such devices in the past has shown that a point spread image size less than 1/10 the field of view is acceptable.

Table 2 indicates the minimum size of a spot focused by the imager on each of the detectors, both on axis and at full field of view. If any spot were too large at full field of view, energy could overlap from one detector onto another. This would give a false alarm wavelength signal and hinder the discrimination usefulness.

In the case of the system being considered, an equivalent spot size of 1/10 the field of view was considered small enough not to trigger false alarms at the full field of view, and to put enough energy on the detector to meet sensitivity requirements. A larger spot would fall off of the detectors at the edge of the field of view. Inasmuch as the preferred detector size is 0.157 inches, a 15.7 mil (0.0157 inch) spot size was considered acceptable. The spot sizes shown in Table 2 are all within this acceptable maximum. In order to make this calculation, 500 rays were sent through the computer modeled optical system and focused onto the detector.

FIG. 4 shows a raytrace for the simplest case of our invention, in this instance drawn by the use of an optical design computer program (ACCOSV), with the zero field of view centered on the middle detector, and with all rays passing from the entrance aperture to the detectors. For this particular case, seven rays were chosen of the wavelength which reflects off of the center dichroic filter 26b. All the rays are shown focused on the center detector, and inasmuch as all seven rays were from the center of the field of view, all rays hit the center of the center detector. Should rays have come from the edge of the field of view, then they would have struck the edge of the center detector.

It should be noted that a raytrace for light reflecting off of the first dichroic filter would show the rays hitting the lower detector, whereas a raytrace for light reflecting off of the third dichroic filter would show the rays hitting the upper detector.

Turning now to FIG. 5, it is to be realized that our system must operate over a large temperature range ($-40°$ to $+50°$ C.) with no active focusing element (passive operation). Consequently, we found it desirable to conduct an optical thermal analysis in order to verify that the system would conform to minimum specifications over that range. This performance specification requires the point spread be no larger than 1/10 the field of view.

In the preferred embodiment, the field of view is one degree (1°) by one degree (1°), which corresponds to 0.157 inches square at the detector plane. As temperature changes over the operating range, the spot blur should not grow more than 10% of this detector width, or 15.7 mils. This value has been determined to be the compromise between minimum crosstalk between buildable detectors, and a buildable system.

FIG. 5 shows that the spot size stays within this criteria if the curve is biased to about 5° C., or in other words, it shows that the system focus must be biased to approximately 5° C. to assure compliance with the performance specification over the entire temperature range.

It is to be realized that FIG. 5 shows how the spot size on an outer detector increases in size as measured in mils (1/1000 inch) with variations in temperature. Spot increases representing 10% of the field of view (i.e., 10% of the detector size) are shown in dotted lines. It is to be noted that most of the spot size variations with temperature fall within these dotted lines (i.e. the spot size rarely increases to more than 10% of the field of view over temperature). Our system was designed to meet this criteria.

With regard to system alignment and test, one of the problems in working with an infra-red system is that the radiation cannot be seen directly by the naked eye. We alleviated that problem by the use of a 10.6 micron interferometer with a video output, which was utilized not only to check the focus and quality of each lens set individually, but was also used to verify the position of each lens in the optical system.

The lens sets of our device are individually checked by sending the collimated output of the interferometer into what would be the collimated output or input of the lens group. This will cause the 10.6 micron radiation to focus down to a point. A mirror which is perpendicular to the optical axis is placed at this focal point, thus sending the radiation back through the lens into the interferometer. The position of the mirror that achieves parallel fringes in the interferometer is the lens back focal length. The radiation passing back through the lens under test then returns into the interferometer to form a fringe pattern from which wavefront distortions are measured. Therefore, back focus, fabrication errors and/or assembly errors may be identified with this simple test.

It is to be understood that we are not to be limited to the specific details set forth in accordance with our preferred embodiment.

Figure 6A:
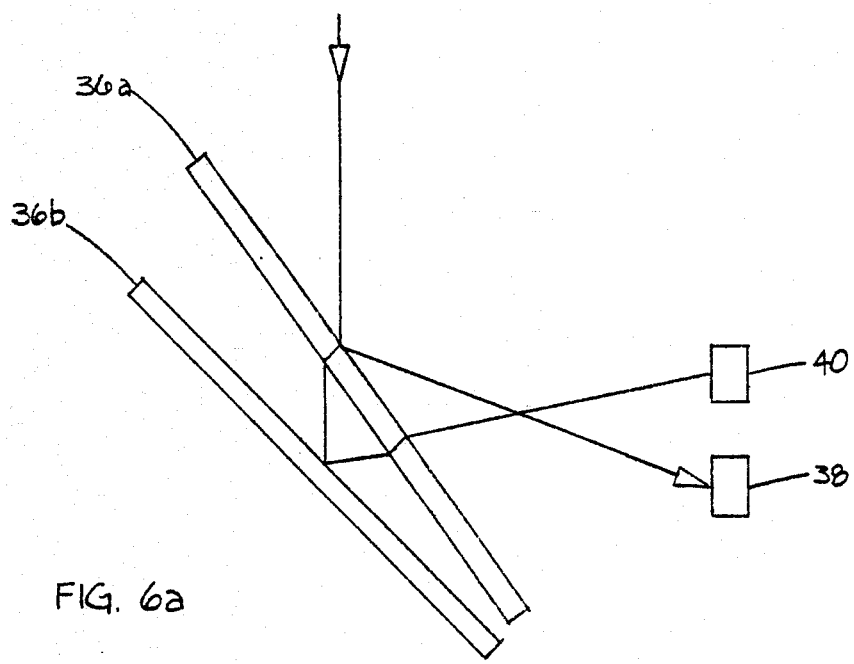
FIGS. 6a and 6b are views of simplified alternate embodiments of wavelength selective reflectors in accordance with out invention, set forth in schematic form.
Figure 6B:
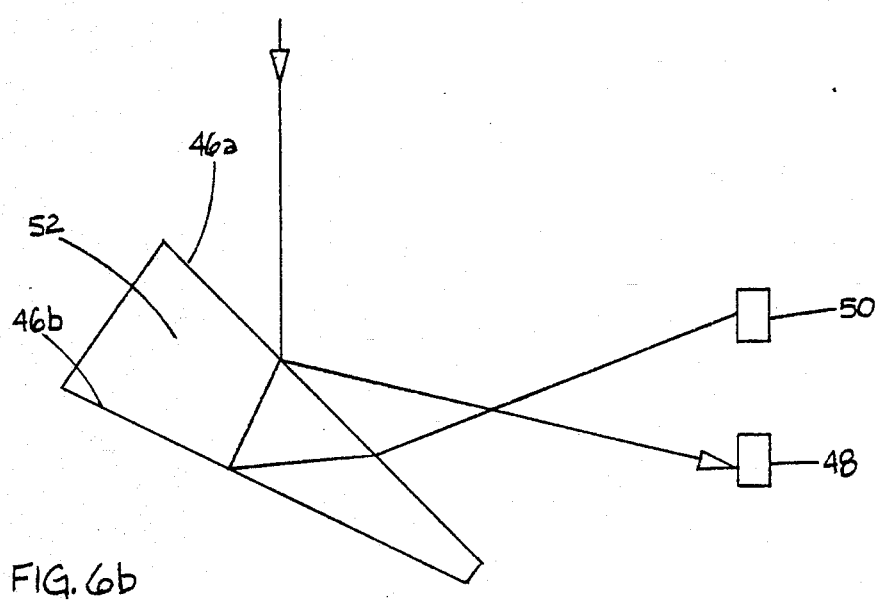

With reference to FIGS. 6a and 6b, it is to be noted that we here illustrate some less complex embodiments of our invention, wherein only two wavelength selective reflectors are utilized.

In FIG. 6a we schematically reveal apparatus for selectively separating predetermined wavelengths or bandwidths of radiant energy from a beam of polychromatic radiant energy, in this instance comprising a first radiant energy deflecting member 36a, otherwise know as a wavelength selective reflector, that is supported in a position of radiant energy deflecting alignment relative to the incoming beam. This first deflecting member 36a is arranged to selectively deflect a first wavelength or bandwidth of radiant energy contained in the beam, while permitting the remainder of the beam to pass through. The radiant energy reflected from 36a may be arranged to impinge on a detector 38.

With regard to FIG. 6a, it is to be realized that the angle of the reflected beam off any dichroic beamsplitter is solely determined by the angle of the beamsplitter off which the beam reflects. Subsequent plates only serve to displace the beam laterally and not angularly.

A second radiant energy deflecting member or wavelength selective reflector 36b is supported in a relatively closely spaced, overlapping alignment with the first deflecting member, and in a position of radiant energy deflecting alignment with respect to the beam after the passage of the beam through the first deflecting member 36a. The spacing and alignment between the first and second deflecting members is such that a first part of the radiant energy deflected by the second deflecting member travels along a path through the first deflecting member. As an option, the second deflecting member may be selected to permit the remainder of the beam to pass through after the first part has been reflected through the first deflecting member 36a. The radiant energy reflected from 36b double passes 36a and may then be arranged to impinge upon detector 40.

As shown in FIG. 6a, the energy deflecting members 36a and 36b can be separated by an air gap, or as illustrated in FIG. 6b, a wavelength refractive material 52 such as optical glass or zinc selenide may be used to separate the first and second deflecting members 46a and 46b, the decision being based upon the spectral band of interest. The first deflecting member 46a may for example be coated on one side of the refractive material 52, and the second deflecting member 46b may be coated on the other side of the refractive material. As will be noted from FIG. 6b, the radiant energy reflected from member 46a may be arranged to impinge upon detector 48, whereas the radiant energy reflected from member 46b may be arranged to impinge upon detector 50.

Figure 7:
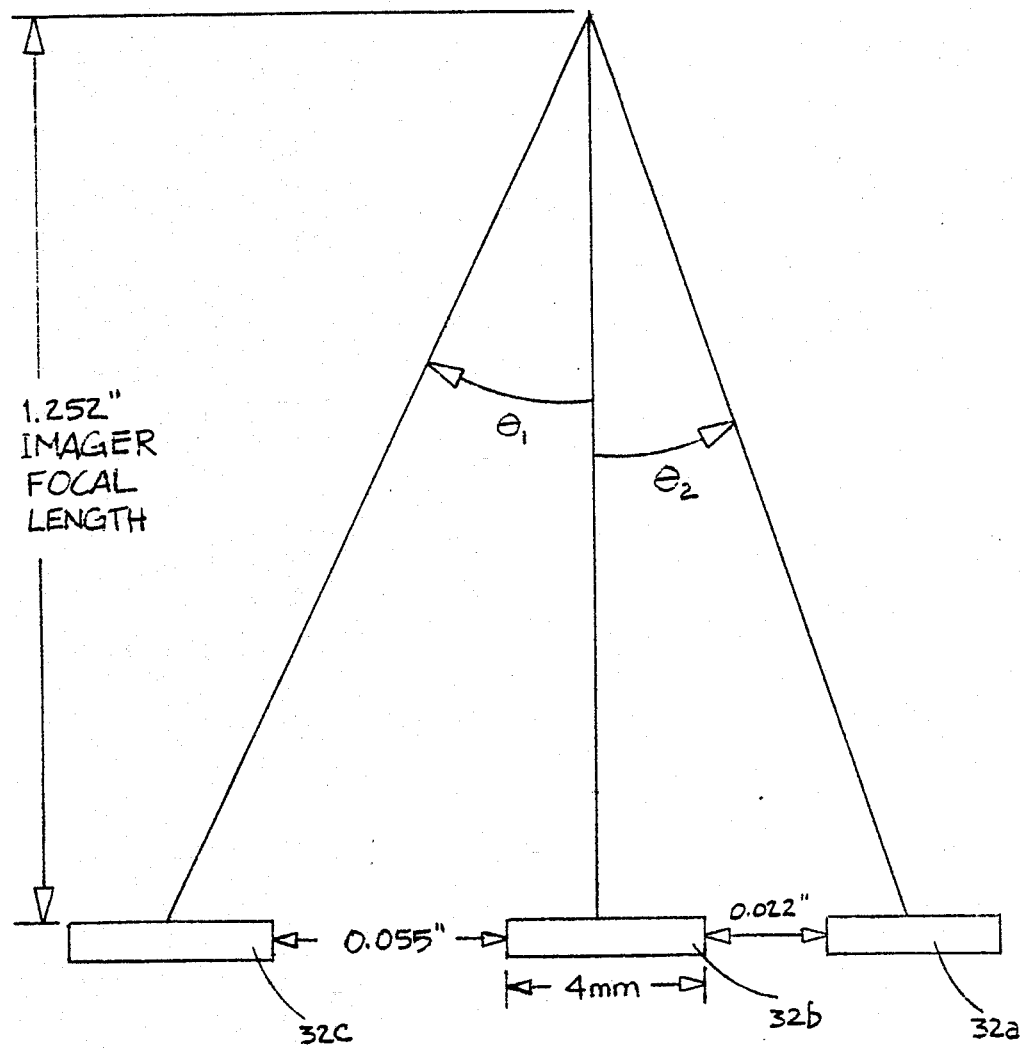
FIG. 7 shows the angles of the central ray onto each detector, with it to be realized that inasmuch as minimum spacing between detectors varies with different detectors, the corresponding angles vary, which is important in determining the angle at which the dichroic beamsplitter in accordance with our invention must be tilted.

FIG. 7 shows the angles of the central ray onto each detector, with detectors 32a, 32b and 32c being in the same relationship as depicted hereinbefore in FIG. 3. We obviously are not to be limited to the physical separation distances called out in this figure. Because the minimum spacing between the detectors for this embodiment varied due to our using different detectors, the corresponding angles are necessarily different.

In this particular embodiment, the focal length of the detector imager lens set is 1.252", and the angles $\theta_1$ and $\theta_2$ are the inverse tangent of the distance from the center of the center detector to the center of the respective outermost detector divided by the imager focal length. This chief ray exit angle from the imager approximates the chief ray acceptance angle into the imager. By the utilization of simple mathematics we were able to determine that $\theta_1$ is 9.628° and $\theta_2$ is 8.155° in this instance. These angles are important because they determine the angle that the dichroic filters must be tilted.

Figure 8:
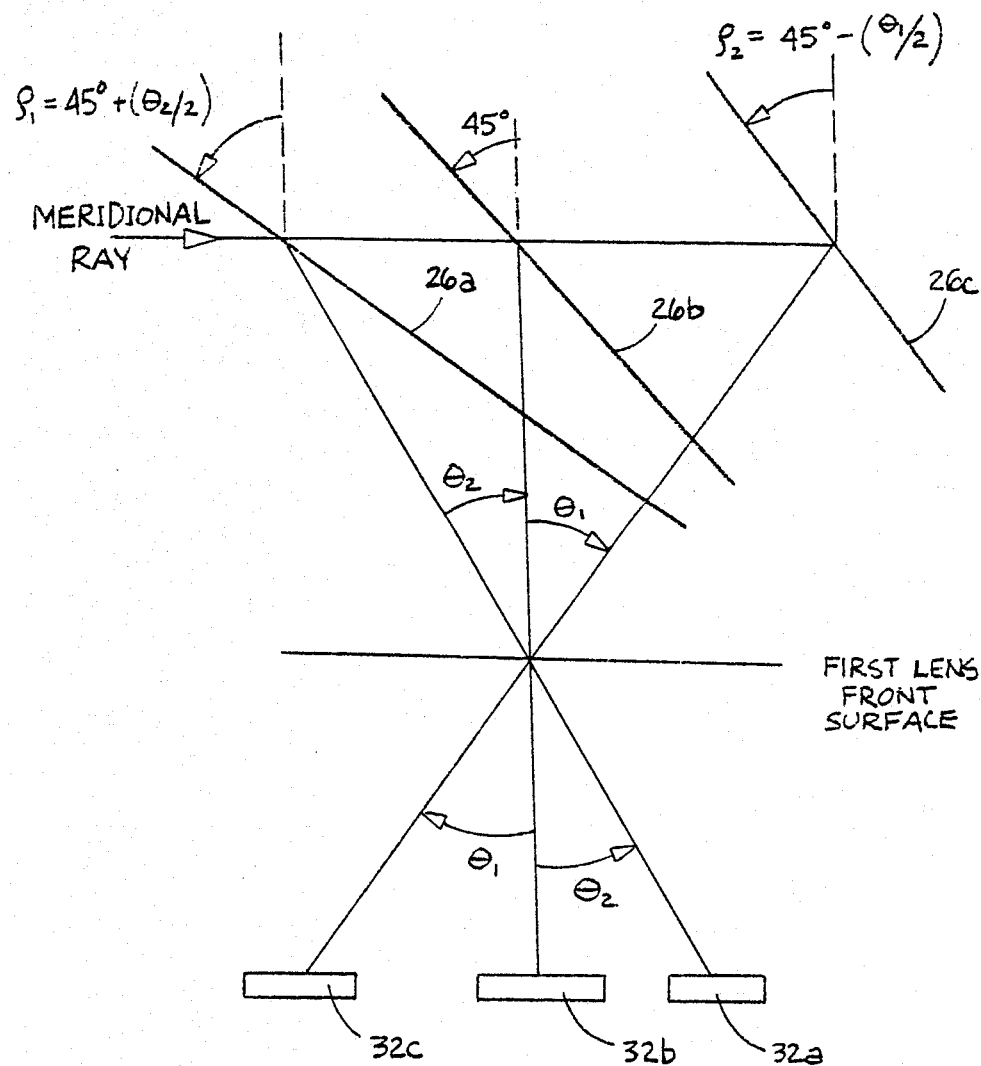
FIG. 8 shows how the angles calculated in FIG. 7 are used to determine the angles of the dichroic filters, with the center dichroic set at a nominal angle of 45°, and the first and third dichroics tilted so that light in each instance will be caused to fall on the correct detector.

FIG. 8 shows how the angles calculated in FIG. 7 are used to determine the angles of the dichroic beamsplitters, thus taking into consideration the size and spacing of the selected detectors. In FIG. 8 as well as in FIG. 9, the dichroic beamsplitters are presumed to be infinitely thin.

The nominal tilt angle is 45° and the center dichroic beamsplitter 26b is set at this angle. Since reflectors cause angle doubling, the first dichroic beamsplitter 26a and third dichroic beamsplitter 26c are tilted $45 + +\theta_2/2$ and $45° - \theta_1/2$ respectively.

In other words, plate 26a will be tilted at 45° plus half the chief ray acceptance angle, whereas plate 26c will be tilted at 45° minus half the chief ray acceptance angle. In the preferred embodiment, we found the angle $p_1$ of 26a to be 49.077°, whereas the angle $p_2$ of 26c is 40.186°, with detector spacing and size being of course the limiting factor.

These tilt angles will cause light to be imaged onto the correct detector. The closer these filters can be spaced together, the smaller the imaging lens may be but the spacing does not effect where the beam will go on the detector—only angle can do this.

It is to be realized that the horizontal line through the vertex located in the center portion of FIG. 8 represents the middle of the first lens front surface.

Figure 9:
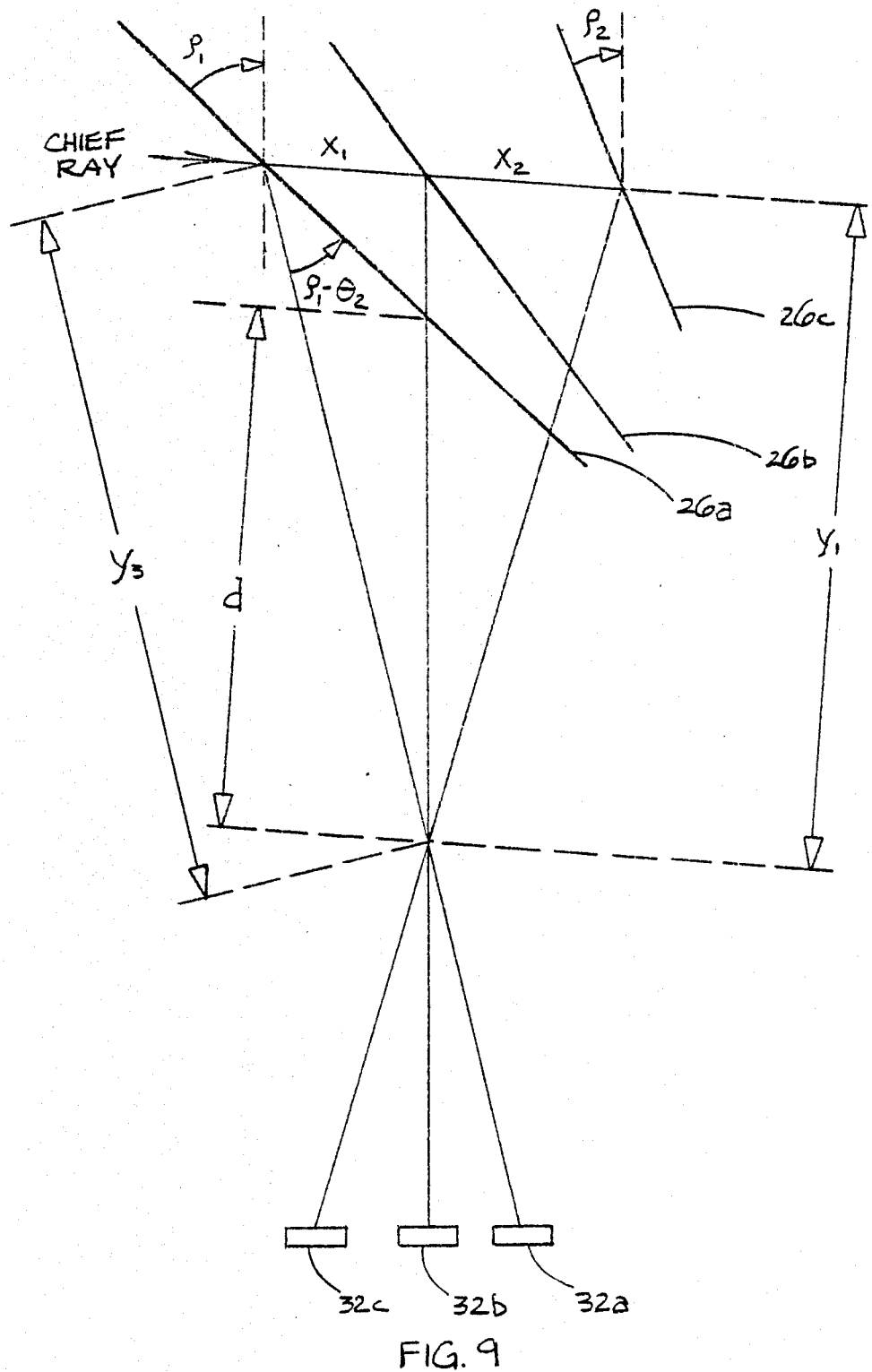
FIG. 9 shows the spacings that can be used to provide a minimum imager lens size based on the diameter of the collimated beam, with these spacings being measured only from the front surface of each dichroic filter.

FIG. 9 shows the spacings that can be used to provide a minimum imager lens size based on the diameter of the collimated beam. It is to be realized that these spacings are measured only from the front surface of each dichroic beamsplitter.

In this figure the dichroic beamsplitters 26a, 26b and 26c may be considered to be in the same relationships as in the preceding figure, and as previously mentioned, the dichroic beamsplitters are assumed to be infinitely thin. The meridional or chief ray here enters from the left, with the spectrally separated wavelengths reflecting off of the dichroic beamsplitters passing through a vertex at the front surface of the first imager lens, with this allowing for the imager lens diameter to be minimized. In other words, at the location where these collimated beams pass through the vertex, a minimum diameter imager lens can be utilized, with these collimated light beams thereafter falling on the previously mentioned detector array, involving detectors 32a, 32b and 32c.

The distance d between dichroic beamsplitter 26a and the vertex point should be minimized from the standpoint of compactness, but on the other hand, the distance d should not be such as to cause the beamsplitter to hit each other should angular adjustment be required. Once distance d is known, the spacing $X_1$ and $X_2$ can be calculated by the use of simple geometry. With distance d being 4.023 inches, the distance $X_1$ was found to be 0.658 inches, the distance $X_2$ was found to be 0.779 inches. The distance from this vertex to the meridional ray was calculated to be 4.594 inches, this being shown as $Y_1$ in FIG. 9. The distance $Y_3$ was found to be 4.641 inches. All of these measurements have herein been rounded off to three decimal places.

Figure 10:
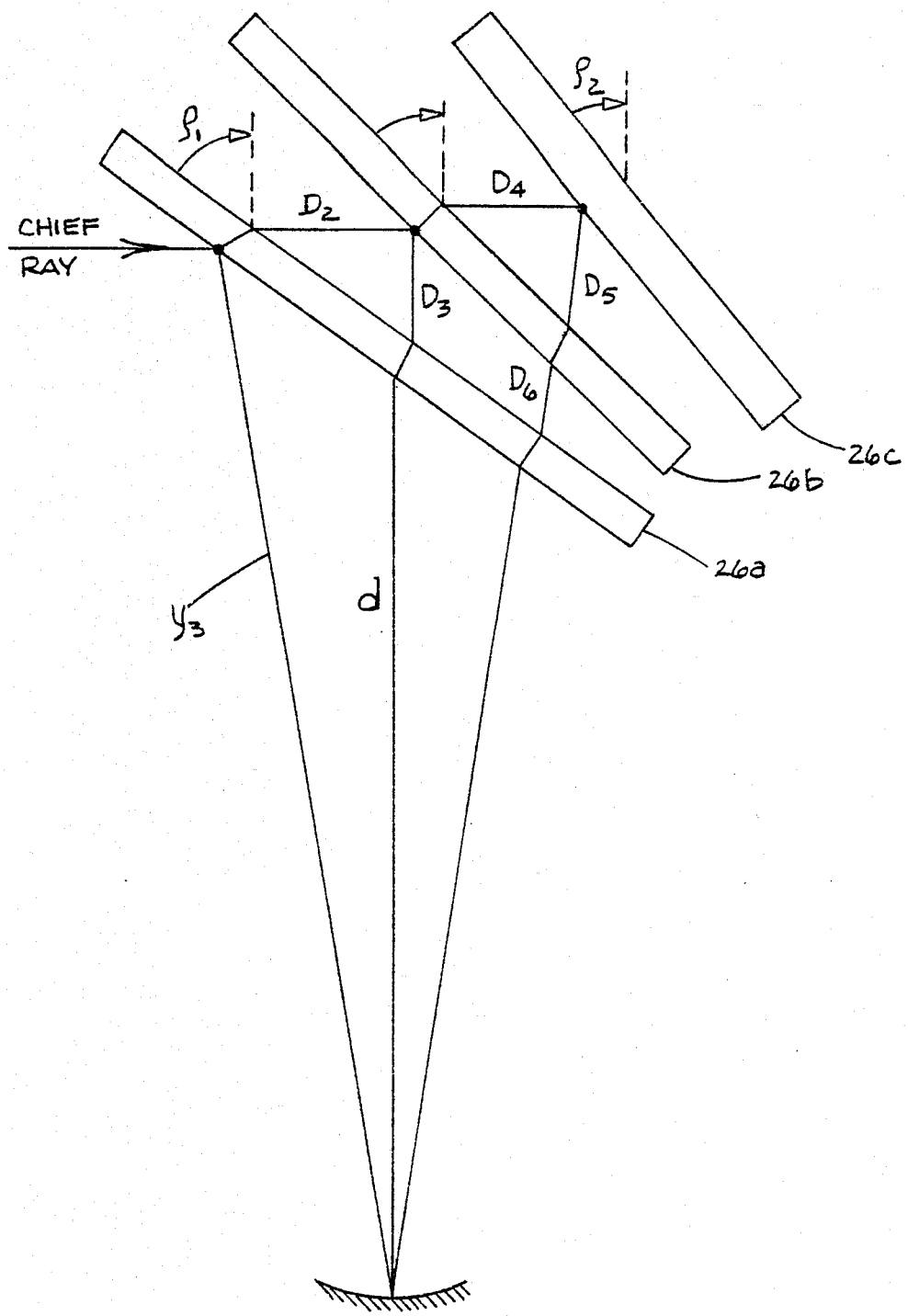
FIG. 10 reveals the information needed by a mechanical designer in constructing a mechanism for tilting the plates at appropriate angles.

FIG. 10 provides some of the information a mechanical designer would need in order to construct a mechanism for tilting the plates at the appropriate angles. In other words, FIG. 10 represents mechanical spacings and relationships as well as angular adjustment criteria.

As in FIG. 9, the meridional or chief ray enters from the left and first strikes the surface of dichroic beamsplitter 26a, with part of this entering ray reflecting down upon the front surface on the imager lens, depicted at the bottom of FIG. 10 by means of a fragmentary lens portion.

Portions of the chief ray passing through dichroic beamsplitter 26a thereafter impinge upon the outer surface of dichroic beamsplitter 26b, with a part of this light energy double passing back through dichroic beamsplitter 26a and thereafter impinging upon the front surface of the imager lens, whereas another portion of the light striking beamsplitter 26b passes on through to strike dichroic beamsplitter 26c. As previously explained, the light energy reflected from dichroic beamsplitter 26c thereafter passes back through dichroic beamsplitters 26b and 26a before impinging upon the aforementioned front surface of the imager lens.

It is to be noted that the three intersection points on the front surfaces of the dichroic beamsplitters have been darkened somewhat, with this representing the pivot locations of the dichroic beamsplitters, about which precise angular adjustments are made during the alignment procedure.

As should now be apparent, our highly advantageous approach involving the use of multiple pass dichroic beamsplitters provides a compact, inexpensive and efficient technique for measuring the energy in a number of specific optical bands simultaneously. Low noise electronic processing of the incoming signals can make possible a background noise limited system (the ideal case), and sensitivities of a fraction of a watt per square centimeter.

Multiple components make transmission losses seem substantial for the particular embodiment described herein, but these are in line with the mid infra-red wavelengths being dealt with. With proper filtering, discrimination ratios better than 10:1 can be obtained.

Our invention is especially suited for infra-red applications, where cooled detectors are required, but in reality, our device is a general purpose radiometer having a wide range of applications.

We claim:

1. Non-prismatic apparatus for selectively separating predetermined wavelengths or bandwidths of radiant energy from a beam of polychromatic radiant energy, comprising:
   (a) a first radiant energy deflecting member of plano parallel construction, supported in a position of radiant energy deflecting alignment relative to the beam, said first deflecting member selectively deflecting a first wavelength or bandwidth of radiant energy contained in the beam while permitting the remainder of the beam to pass through; and
   (b) a second radiant energy deflecting member of plano parallel construction, supported in a relatively closely spaced, overlapping alignment with said first deflecting member and in a position of radiant energy deflecting alignment with respect to the beam after the passage of the beam through said first deflecting member, the spacing and alignment between said first and second deflecting members being such that the radiant energy deflected by said second deflecting member passes along a path that is in part through said first deflecting member.

2. Apparatus as recited in claim 1 wherein said second deflecting member is selected to deflect a second wavelength or bandwidth of radiant energy, while permitting the remainder of the beam to pass therethrough.

3. Apparatus as recited in claim 1 wherein said deflecting members are separated in part by an air gap.

4. Apparatus as recited in claim 1, further comprising a radiant energy refractive member disposed between said deflecting members.

5. Apparatus as recited in claim 4 wherein said first radiant energy deflecting member is mounted on one side of said refractive member, and said second radiant energy deflecting member is mounted on the opposite side thereof.

6. Apparatus as recited in claim 1 in which the deflected beams from said first and second deflecting members impinge upon first and second detectors, said first detector being arrayed so as to intercept said first wavelength of radiant energy deflected by said first deflecting member, and said second detector being arrayed so as to intercept said second wavelength of radiant energy deflected by said second deflecting member.

7. Apparatus as recited in claim 6 in which said first and second detectors are mounted on a common cold member.

8. Apparatus as recited in claim 7 in which said cold member is cold finger.

9. Apparatus as recited in claim 7 in which said cold member is a cooling substrate.

10. Apparatus as recited in claim 1 in which said first wavelength of radiant energy deflected by said first deflecting member, and said second wavelength of radiant energy deflected by said second deflecting member, are each caused to pass through common imaging optics, with said first and second wavelengths of radiant energy thereafter being directed onto separate detectors.

11. Apparatus as recited in claim 10 in which said detectors are mounted on a common cold member.

12. A wavelength discriminator designed to collect broadband, multiple wavelength input energy, to isolate specific narrow bands of interest, and to image such narrow bands of interest upon closely spaced, separate detectors, said discriminator comprising means for directing incoming radiant energy of a certain quality and involving a wide range of wavelengths through first and second wavelength selective reflectors separated by a medium that transmits the wavelengths of interest, said wavelength selective reflectors being in a non-parallel configuration and disposed in a double pass geometrical arrangement wherein energy of a certain wavelength reflected from said second wavelength selective reflector passes back through said first wavelength selective reflector, and means for directing the energy from said first and second wavelength reflectors onto said closely spaced detectors.

13. The wavelength discriminator as recited in claim 12 in which said first and second wavelength selective reflectors are utilized in conjunction with a third wavelength selective reflector, with all three of said wavelength selective reflectors being disposed in a closely spaced, non-parallel arrangement to receive incoming radiant energy, the energy of a certain wavelength reflected from said third wavelength selective reflector passing through said second and said first wavelength selective reflectors, the energy from said third wavelength selective reflector thereafter impinging upon a detector separate from, but closely adjacent, the detectors associated with said first and second wavelength selective reflectors.

14. The wavelength discriminator as recited in claim 13 in which said detectors are operatively disposed on a common cooling device.

15. A wavelength discriminator designed to collect broadband, multiple wavelength input energy, to isolate specific narrow bands of interest, and to image such narrow bands of interest upon closely spaced, separate detectors, said discriminator comprising means for directing incoming radiant energy of a certain quality and involving a wide range of wavelengths through first and second wavelength selective reflectors separated by a medium that transmits the wavelengths of interest, said wavelength selective reflectors being in a non-parallel configuration and disposed in a double pass geometrical arrangement wherein energy of a certain wavelength reflected from said second wavelength selective reflector passes back through said first wavelength selective reflector, said double pass arrangement making possible the use of a common imaging system for focussing light rays of different wavelengths reflected from said non-parallel wavelength selective reflectors, that have been angularly displaced by the non-parallelism, onto said detectors.

16. The wavelength discriminator as recited in claim 15 in which said first and second wavelength selective reflectors are utilized in conjunction with a third wavelength selective reflector, with all three of said wavelength selective reflectors being disposed in a closely spaced, non-parallel arrangement to receive incoming radiant energy, the energy of a certain wavelength reflected from said third wavelength selective reflector passing through said second and said first wavelength selective reflectors before passing through said common imaging system, the energy from said third wavelength selective reflector thereafter impinging upon a detector separate from, but closely adjacent, the detectors associated with said first and secon wavelength selective reflectors.

17. The wavelength discriminator as recited in claim 16 in which said detectors are operatively disposed on a common cooling device.

18. A wavelength discriminator designed to collect broadband, multiple wavelength radiation, to isolate specific narrow bands of interest, and to image such narrow bands of interest upon a closely grouped array of discrete detectors, said discriminator comprising means for collimating incoming radiation of interest and for directing such radiation through first and second wavelength selective reflectors in a non-parallel arrangement, that are separated by a medium that transmits the wavelengths of interest, the radiant energy of a certain wavelength reflected from said second wavelength selective reflector passing back through said first wavelength selective reflector, and common imager means serving to combine the optical paths of said two separate wavelengths, and thereafter direct radiant energy containing the wavelengths upon separate detectors of said array.

19. A wavelength discriminator as recited in claim 18 in which said closely grouped detectors are cooled by a single detector cooler.

20. The wavelength discriminator as recited in claim 18 in which said first and second wavelength selective reflectors are utilized in conjunction with a third wavelength selective reflector, with all three of said wavelength selective reflectors being disposed in a closely spaced, non-parallel arrangement in which energy reflected from said third wavelength selective reflector passes through said second and said first wavelength selective reflectors before passing through said common imager means, and thereafter onto a separate detector of said detector array.

21. A wavelength discriminator designed to collect broadband energy, to isolate specific narrow bands of interest, and to image such narrow bands of interest upon a detector array, said discriminator comprising means for directing incoming radiant energy of a certain quality and involving a wide range of wavelengths through first and second wavelength selective reflectors disposed in a non-parallel array, said wavelength selective reflectors being disposed in a double pass geometrical arrangement wherein energy of a certain wavelength reflected from said second wavelength selective reflector passes back through said first wavelength selective reflector, said reflectors serving to combine the optical paths of two selected wavelengths, yet angularly separating them, and thereafter directing radiant energy containing the wavelengths of interest through common optics onto said detector array, said detector array involving spatially separated detectors, whereby each wavelength of interest may be discriminated.

22. The wavelength discriminator as recited in claim 21 wherein said second wavelength selective reflector is coated to deflect a second wavelength or bandwidth of radiant energy while permitting the remainder of said beam to pass therethrough.

23. The wavelength discriminator as recited in claim 21 wherein said detectors are cooled by a common cooling device.

24. The wavelength discriminator as recited in claim 21 wherein said wavelength selective reflectors are separated in part by an air gap.

25. The wavelength discriminator as recited in claim 21 further comprising a radiant energy refractive member disposed between said wavelength selective reflectors.

26. The wavelength discriminator as recited in claim 25 wherein said first wavelength selective reflector is mounted on one side of said refractive member, and said second wavelength selective reflector is mounted on the opposite side thereof.

27. A wavelength discriminator designed to collect broadband energy, to isolate specific narrow bands of interest, and to image such narrow bands of interest upon respective detectors of a closely spaced array cooled by a single detector cooler, said discriminator comprising a window serving as the collection aperture for the entry of broadband radiation, a folding flat mirror, a parabolic mirror, said folding flat mirror having a central aperture, a field stop located behind such aperture and located at the focal point of the parabola, said field stop permitting entry of radiation of interest, while serving to prevent radiation outside the field of view from impinging upon said detectors, means for collimating the incoming radiation of interest and directing same upon a plurality of wavelength selective reflectors disposed in a non parallel, double pass array, said wavelength selective reflectors serving to combine the optical paths of selected wavelengths, yet angularly separating them, and common imager means for thereafter directing radiant energy containing the wavelengths of interest upon respective detectors of said array.

28. The wavelength discriminator as recited in claim 27 in which said plurality involves three wavelength selective reflectors, wherein energy of a certain wavelength reflected from the second reflector passes back through the first reflector, and energy of a different wavelength reflected from the third reflector passes through both said second and said first reflectors, with the selected wavelengths thereafter falling upon three separate detectors of said array.

29. The wavelength discriminator as recited in claim 27 in which said folding flat mirror is angularly adjustable to provide a field of regard.

30. The wavelength discriminator as recited in claim 27 wherein a pair of wavelength selective reflectors are utilized, and a second of said second wavelength selective reflectors is coated to deflect a second wavelength or bandwidth of radiant energy while permitting the ramainder of said beam to pass therethrough.

31. The wavelength discriminator as recited in claim 27 wherein said detectors are cooled by a common cooling device.

32. The wavelength discriminator as recited in claim 27 wherein said wavelength selective reflectors are separated in part by an air gap.

33. The wavelength discriminator as recited in claim 27, further comprising a radiant energy refractive member disposed between said wavelength selective reflectors.

* * * * *